(12) United States Patent
Guo

(10) Patent No.: US 8,990,207 B2
(45) Date of Patent: Mar. 24, 2015

(54) OPTIMIZATION AND VISUAL CONTROLS FOR REGIONALIZATION

(75) Inventor: Diansheng Guo, Columbia, SC (US)

(73) Assignee: University of South Carolina, Columbia, SC (US)

(*) Notice: Subject to any disclaimer, the term of this patent is extended or adjusted under 35 U.S.C. 154(b) by 312 days.

(21) Appl. No.: 12/961,080

(22) Filed: Dec. 6, 2010

(65) Prior Publication Data

US 2011/0137903 A1    Jun. 9, 2011

Related U.S. Application Data

(60) Provisional application No. 61/283,547, filed on Dec. 4, 2009.

(51) Int. Cl.
*G06F 17/30* (2006.01)
*G06F 7/00* (2006.01)
*G06K 9/34* (2006.01)
*G06K 9/62* (2006.01)
*G09B 29/10* (2006.01)

(52) U.S. Cl.
CPC ...... *G06F 17/30241* (2013.01); *G06F 17/3087* (2013.01); *G06K 9/342* (2013.01); *G06K 9/6219* (2013.01); *G09B 29/106* (2013.01)
USPC ............................................ 707/737; 706/19

(58) Field of Classification Search
CPC .................. G06F 17/30241; G06F 17/3087
USPC ............................................ 707/737; 706/19
See application file for complete search history.

(56) References Cited

U.S. PATENT DOCUMENTS

| | | | | |
|---|---|---|---|---|
| 6,952,700 | B2* | 10/2005 | Modha et al. | 707/777 |
| 7,406,200 | B1* | 7/2008 | Syeda-Mahmood et al. | 382/225 |
| 7,958,120 | B2* | 6/2011 | Muntz et al. | 707/736 |
| 8,165,973 | B2* | 4/2012 | Alexe et al. | 706/12 |
| 8,275,649 | B2* | 9/2012 | Zheng et al. | 705/7.34 |
| 8,280,887 | B1* | 10/2012 | Stork et al. | 707/737 |
| 2002/0084258 | A1* | 7/2002 | Martinez | 218/43 |
| 2002/0188618 | A1* | 12/2002 | Ma et al. | 707/102 |
| 2006/0271564 | A1* | 11/2006 | Meng Muntz et al. | 707/100 |
| 2007/0271278 | A1* | 11/2007 | Acharya | 707/100 |
| 2010/0274543 | A1* | 10/2010 | Walker et al. | 703/6 |
| 2012/0246164 | A1* | 9/2012 | Xavier et al. | 707/737 |

OTHER PUBLICATIONS

Raymond Ng and Jiawei Han, Efficeint and Effective Clustering Methods for Spatial Data Mining, 20th VLDB Conference, publish 1994, pp. 144-155.*
Eduardo Morales and Yosu Mendizabal, A New Contiguity-Constrained Agglomerative Hierarchical Clustering Algorithm for Image Segmentation, published 2009, pp. 261-270.*

(Continued)

*Primary Examiner* — Jeffrey A Burke
(74) *Attorney, Agent, or Firm* — Dority & Manning, P.A.

(57) ABSTRACT

In accordance with certain embodiments of the present disclosure, a regionalization method is disclosed. The method includes inputting a data set into a computer. The method further includes utilizing the computer to perform contiguity-constrained hierarchical clustering on the data set to generate two regions and performing a fine-tuning procedure on the two regions with the computer to iteratively modify the boundaries between the two regions.

17 Claims, 3 Drawing Sheets

(56) References Cited

OTHER PUBLICATIONS

Hai Jin and Diansheng Guo, Understanding Climate Change Patterns with Multivariate Geovisualization, 2009 IEEE International Conference on Data Mining Workshops, published 2009, pp. 217-222.*
Christopher Eick et al., Discovery of Interesting Regions in Spatial Data Sets Using Supervised Clustering, PKDD 2006, pp. 137-138, published 2006.*
Chris Ding and Xiaofeng He, Cluster Merging and Splitting in Hierarchical Clustering Algorithms, published 2002.*
Alexandre Carvalho et al., Spatial Hierarchical Clustering, Rev. Bras. Biom. Sao Paulo, v. 27, n. 3, p. 411-442, published 2009.*
Yaqin Wang et al., SPANBRE: An Efficient hierarchical Clsutering Algorithm for Spatial Data with Neighborhood Relations, 4th International Conference on Fuzzy Systems and Knowledge Discovery, published 2007.*
F. Murtagh, Interpreting the Kohonen Self-Organizing Feature map using Contiguity Constrained Clustering, Pattern Recognition Letters 16, published Apr. 1995.*
Xiaolan Wu, Quantification and Optimization of Spatial Contiguity in Land use Planning, published 2005.*
Assuncao et al., Efficient Regionalisation Techniques for Socio-economic Geographical Units using Minimum Spanning Trees, International Journal of Geographical Information Sciences, published Aug. 3, 2006.*
Altman et al., "Bard: Better Automated Redistricting," Journal of Statistical Software, vol. 42, No. 4, pp. Jun. 2011, pp. 1-28.
Felner, "Finding Optimal Solutions to the Graph Partitioning Problem with Heuristic Search," Annals of Mathematics and Artificial Intelligence, vol. 45, No. 3-4, Dec. 2005, pp. 293-322.
Fovell et al., "Climate Zones of the Conterminous United States Defined Using Cluster Analysis," Journal of Climate, vol. 6, No. 11, Nov. 1993, pp. 2103-2135.
Gabow, "Path-Based Depth-First Search for Strong and Biconnected Components", Information Processing Letters, vol. 74, 2000, pp. 107-114.
Guo, "Flow Mapping and Multivariate Visualization of Large Spatial Interaction Data", IEEE Transactions on Visualization and Computer Graphics, vol. 15, No. 6, Nov./Dec. 2009, pp. 1041-1048.
Guo, "Regionalization with Dynamically Constrained Agglomerative Clustering and Partitioning (REDCAP)," International Journal of Geographical Information Science, vol. 22, No. 7, Jul. 2008, pp. 801-823.
Haining et al., "Constructing Regions for Small Area Analysis: Material Deprivation and Colorectal Cancer," Journal of Public Health Medicine, vol. 16, No. 4, Dec. 1994, pp. 429-438.
Handcock et al., "Spatio-Temporal Analysis Using a Multiscale Hierarchical Ecoregionalization," Photogrammetric Engineering and Remote Sensing, vol. 70, 2004, pp. 101-110.
Karypis et al., "Multilevel K-Way Partitioning Scheme for Irregular Graphs," Journal of Parallel and Distributed Computing, vol. 48, No. 1, Jan. 1998, pp. 96-129.
Newman, "Modularity and Community Structure in Networks," Proceedings of the National Academy of Sciences of the United States of America, vol. 103, No. 23, Jun. 2006, pp. 8577-8582.
Openshaw et al., "Algorithms for Reengineering 1991 Census Geography," Environment & Planning A, vol. 27, No. 3, Mar. 1995, pp. 425-446.
Osnes, "Iterative Random Aggregation of Small Units Using Regional Measures of Spatial Autocorrelation for Cluster Localization," Statistics in Medicine, vol. 18, No. 6, Mar. 1999, pp. 707-725.
Saab, "An Effective Multilevel Algorithm for Bisecting Graphs and Hypergraphs," IEEE Transactions on Computers, vol. 53, No. 6, Jun. 2004, pp. 641-652.
Sharon et al., "Hierarchy and Adaptivity in Segmenting Visual Scenes," Nature, vol. 442, No. 7104, Aug. 2006, pp. 810-813.
Shi et al., "Normalized Cuts and Image Segmentation," IEEE Transactions on Pattern Analysis Machine Intelligence, vol. 22, No. 8, Aug. 20000, pp. 888-905.
Tarjan, "Depth-First Search and Linear Graph Algorithms," SIAM Journal of Computing, vol. 1, No. 2, Jun. 1972, pp. 146-160.
Tobler, "Geographical Filters and Their Inverses," Geographical Analysis, vol. 1, No. 3, Jul. 1969, pp, 234-253.
Ward, "Hierarchical Grouping to Optimise an Objective Function," Journal of the American Statistical Association, vol. 58, No. 301, Mar. 1963, pp. 236-244.
Wise et al., "Regionalization Tools for the Exploratory Spatial Analysis of Health Data", Recent Developments in Spatial Analysis: Spatial Statistics, Behavioural Modelling and Neuro-Computing, M. Fischer and A. Getis, eds., Berlin: Springer-Verlag, 1997, pp. 83-100.

* cited by examiner

OPTIMIZATION AND VISUAL CONTROLS FOR REGIONALIZATION

CROSS-REFERENCE TO RELATED APPLICATION

The present application is based on and claims priority to U.S. Provisional Application 61/283,547 having a filing date of Dec. 4, 2009, which is incorporated by reference herein.

GOVERNMENT SUPPORT CLAUSE

This invention was made with government support under grant number BCS 0748813 awarded by National Science Foundation. The government has certain rights in the invention.

BACKGROUND

Constructing regions with geographic datasets while optimizing an objective function and satisfying multiple constraints is an important task for many research problems such as climate zoning, eco-region analysis, map generalization, census reengineering, public health mapping, and political districting.

Given a set of spatial objects, each of which having one or more attribute values, a regionalization method attempts to find an optimal grouping of the objects into a number of regions (which must be spatially contiguous) and meanwhile optimizes an objective function (e.g., a measure of multivariate similarities within regions). This is a combinatorial problem—it is not practical to enumerate all possible groupings to find the global optimal. Therefore, a regionalization method usually adopts heuristic-based approaches to reach a near-optimal solution.

A number of conventional regionalization methods exist. General-purpose clustering methods do not consider spatial contiguity and thus data items in a cluster are not necessarily contiguous in the geographic space. Existing regionalization methods that are based on the clustering concept often take three different strategies: (1) general-purpose clustering followed by spatial processing; (2) general-purpose clustering with a spatially weighted dissimilarity measure; and (3) enforcing contiguity constraints during the clustering process.

The first group of methods utilizes a general-purpose clustering method to derive clusters based on multivariate similarity and then divide or merge the clusters to form contiguous regions. The drawback of these types of methods is that the number and quality of regions is very difficult to control.

The second type of methods incorporates spatial distance explicitly in the similarity measure for a general clustering method (e.g., K-Means) and thus data items in the same cluster tend to be spatially close to each other. However, the spatial contiguity of a cluster is not guaranteed. Moreover, the incorporation of spatial distance in the similarity measure reduces the importance of multivariate information and may also not be able to find clusters of arbitrary shapes.

The third approach, represented by Regionalization with Dynamically Constrained Agglomerative Clustering and Partitioning (REDCAP), explicitly incorporates spatial contiguity constraints (rather than spatial similarities) in a hierarchical clustering process. Particularly, the REDCAP approach can optimize an objective function during the construction and partitioning of a cluster hierarchy to obtain a given number of regions. REDCAP is a family of six regionalization methods, which respectively extend the single-linkage (SLK), average-linkage (ALK), and complete-linkage (CLK) hierarchical clustering methods to enforce spatial contiguity constraints during the clustering process. These six methods are similar in that they all iteratively merge clusters (which must be spatial neighbors) into a hierarchy and then partition the hierarchy to obtain regions. They differ in their definitions of "similarity" between two clusters.

Although REDCAP methods are better than other methods and can produce reasonably good regions, there is much room for improvement in terms of optimizing the objective function.

Graph-partitioning methods may also be used to partition the data into a number of parts while optimizing an objective function, e.g., minimizing the total weights of edges to be cut. However, most graph partitioning methods cannot consider spatial contiguity constraint, except graph-based image segmentation methods. Even image segmentation methods focus on detecting objects in images and are not able to optimize an objective function based on within region homogeneity.

As such, a need exists for a contiguity constrained hierarchical clustering and optimization method that can partition a set of spatial objects into a hierarchy of contiguous regions while optimizing an objective function.

SUMMARY

In accordance with certain embodiments of the present disclosure, a regionalization method is disclosed. The method includes inputting a data set into a computer. The method further includes utilizing the computer to perform contiguity-constrained hierarchical clustering on the data set to generate two regions and performing an optimization procedure on the two regions with the computer to iteratively modify the boundaries between the two regions. The optimization procedure is unique and more powerful than existing methods in that it systematically maintains geographic contiguity and allows multi-object moves. Existing methods only allow one object to move during the modification.

In still other embodiments of the present disclosure, a system for regionalization is described. The system includes a computer configured to receive a data set. The computer is configured to perform contiguity-constrained hierarchical clustering on the data set to generate two regions and perform a fine-tuning procedure on the two regions to iteratively modify the boundaries between the two regions.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

DETAILED DESCRIPTION

Figure 1:
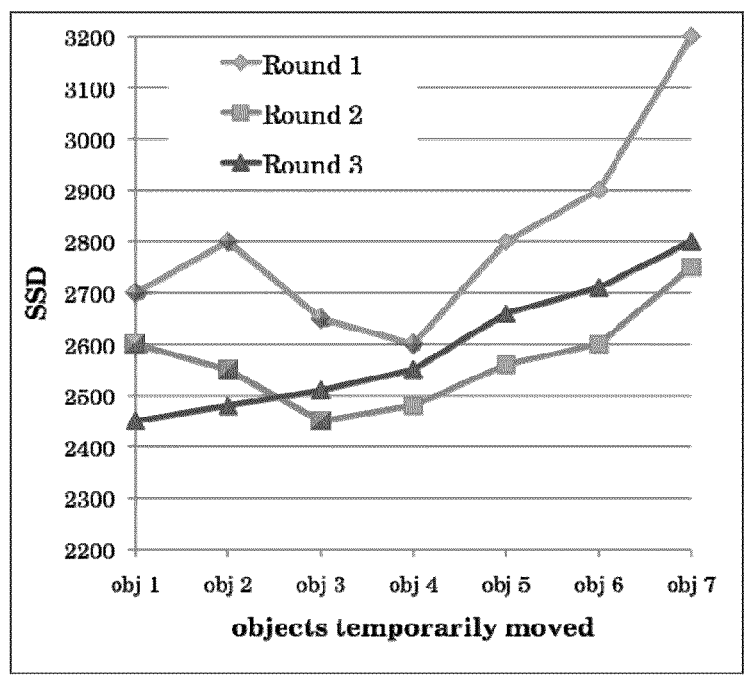
FIG. 1 illustrates an example of the iterative fine-tuning procedure.

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The systems and methods discussed herein can be implemented using servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes can be implemented using a single server or multiple servers working in combination. Databases and applications can be implemented on a single system or distributed across multiple systems. Distributed components can operate sequentially or in parallel.

When data is obtained or accessed between a first and second computer system or component thereof, the actual data can travel between the systems directly or indirectly. For example, if a first computer accesses a file or data from a second computer, the access can involve one or more intermediary computers, proxies, and the like. The actual file or data can move between the computers, or one computer can provide a pointer or metafile that the second computer uses to access the actual data from a computer other than the first computer, for instance.

The various computer systems that can be utilized with the present disclosure are not limited to any particular hardware architecture or configuration. Embodiments of the methods and systems set forth herein can be implemented by one or more general-purpose or customized computing devices adapted in any suitable manner to provide desired functionality. The device(s) can be adapted to provide additional functionality complementary or unrelated to the present subject matter, as well. For instance, one or more computing devices can be adapted to provide desired functionality by accessing software instructions rendered in a computer-readable form. When software is used, any suitable programming, scripting, or other type of language or combinations of languages can be used to implement the teachings contained herein. However, software need not be used exclusively, or at all. For example, some embodiments of the methods and systems set forth herein can also be implemented by hard-wired logic or other circuitry, including, but not limited to application-specific circuits. Of course, combinations of computer-executed software and hard-wired logic or other circuitry can be suitable, as well.

Embodiments of the methods disclosed herein can be executed by one or more suitable computing devices. Such system(s) can comprise one or more computing devices adapted to perform one or more embodiments of the methods disclosed herein. As noted above, such devices can access one or more computer-readable media that embody computer-readable instructions which, when executed by at least one computer, cause the at least one computer to implement one or more embodiments of the methods of the present subject matter. Additionally or alternatively, the computing device(s) can comprise circuitry that renders the device(s) operative to implement one or more of the methods of the present subject matter.

Any suitable computer-readable medium or media can be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

The present disclosure also can also utilize a relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network can comprise any number and/or combination of hard-wired, wireless, or other communication links.

The present disclosure is generally directed to an iterative clustering and optimization approach to regionalization, which significantly outperforms existing methods by a large margin. The new approach includes two steps:

1. Contiguity constrained hierarchical clustering, which optimizes an objective function at each merge, enforces spatial contiguity, and eventually produces two clusters (regions);
2. Greedy optimization with a fine-tuning procedure, which iteratively modifies the boundaries between the two clusters (regions) by moving one or several objects from one region to the other. This step can simultaneously maintain the geographic contiguity and significantly improve the region quality (i.e., a much better objective value).

The above two steps are then repeated for each of the two newly generated regions to construct a hierarchy of regions. Both steps enforce the spatial contiguity constraint and therefore clusters at any hierarchical level are guaranteed to be spatially contiguous. There are two main contributions to the approach described herein.

First, the same objective function is used for both the clustering and the greedy optimization while conventional approaches use different criteria in the two steps. This improvement enables the integration of different objective functions to accommodate different requirements in different applications.

Second, the greedy optimization (fine-tuning) step described in the present disclosure significantly improves the quality of regionalization, as further demonstrated herein. This fine-tuning procedure can be combined with any existing regionalization method to improve its result. The superior optimization power of this fine-tuning procedure lies in that it can allow much more potential moves (including both single-object moves and multiple-object moves) while maintaining the geographic contiguity (see FIG. 2).

The regionalization method of the present disclosure is an iterative procedure that partitions a data set into a hierarchy of clusters under contiguity constraint. The method can be conceptualized as the following three steps:

Generate a hierarchy of clusters with a contiguity-constrained clustering method, such as that further described herein;
Enhance the top two regions in the hierarchy with a greedy optimization (fine-tuning) procedure;

Repeat the above two steps to temporarily partition each of existing regions into two, and accept the best among all partitions as the next level of the hierarchy.

The above steps form a top-down procedure, which starts with the entire data as one region and generates one more region at a time. The iteration stops when a given condition is met, such as a maximum number of regions, a minimum size of a region, or a threshold of a quality measure. In other words, the disclosed method is not only able to significantly improve region qualities but can also consider multiple constraints. Below, the first two steps are explained in detail.

In accordance with the present disclosure, a suitable contiguity-constrained clustering method for hierarchical clustering is described. The method improves upon that described in J. H. Ward, "Hierarchical Grouping to Optimize an Objective Function," Journal of the American Statistic Association, vol. 58, pp. 236-244, 1963, incorporated by reference herein. The method seeks to partition a set of data items into a number of clusters while minimizing the information loss associated with each grouping. This information loss can be defined in terms of the sum of squared differences (SSD), which is defined in Equations (1) and (2).

$$SSD(R) = \sum_{j=1}^{d} \sum_{i=1}^{n_r} (x_{ij} - \bar{x}_j)^2 \quad (1)$$

$$SSD = \sum_{j=1}^{k} SSD(R_j) \quad (2)$$

In equation (1), R is a region, SSD(R) denotes its SSD value, d is the number of attributes, $n_r$ is the number of objects in R, $x_{ij}$ is the value for the $j_{th}$ attribute of the $i_{th}$ object, and $\bar{x}_j$ is the mean value of the $j_{th}$ attribute for all objects in R. The SSD value for a regionalization result is the sum of the SSD values of all regions (k is the total number of regions).

At each step in the clustering method, the union of every possible cluster pair is considered and the two clusters whose fusion results in minimum increase in SSD are combined. Below is the proposed contiguity-constrained clustering algorithm.

Algorithm 1: Contiguity-Constrained Method
Input: V: multivariate spatial data points, |V|=n;
C: C(u, v)=1 if u, v ∈V are contiguous
(1) Set R={$R_1, R_2, \ldots R_n$}, i.e., each data point is a cluster (region) by itself;
(2) Set edges E=Ø
(3) For each $R_u$ and $R_v \in$ R, If C(u, v)=1
Add an edge e=<$R_u$, $R_v$> to E

|e|=SSD($R_u \cup R_v$)−SSD($R_u$)−SSD($R_v$)

(4) Repeat the following steps until |R|=2
a) Find the shortest edge e* in E
b) Let $R_u$, $R_v$ be the two clusters that e* connects
c) Remove e* from E, and remove $R_v$ from R
d) Update $R_u$=$R_u \cup R_v$
e) Redirect edges incident on $R_v$ to $R_u$ (remove duplicate edges if a cluster connects to both $R_v$ and $R_u$)
f) Update the length of edges related to $R_u$ The time complexity of the above contiguity-constrained clustering is $O(n^2d)$, where n is the number of data points and d is the number of variables. Since E only contains edges that connect spatial neighbors, |E| is proportional to n. Updating the length of an edge (i.e., the SSD difference before and after the merge) only takes constant time if the multivariate mean vector and size for each region are stored (see Equation 3). In other words, there is no need to visit each data point to calculate the SSD value of the newly merged cluster since the difference in SSD is what is necessary.

As described above, Step (4) in the algorithm is iterated exactly n−1 times, and each iteration takes O(nd) time to find the shortest edge, make the merge, and update related edges in E. Therefore the overall time complexity is $O(n^2d)$.

$$SSD(R) - SSD(R_u) - SSD(R_w) = \sum_{j=1}^{d} D(|R_u|\overline{x_{uj}}^2 + 1|R_y|\overline{x_{uj}}^2 + |R|\overline{x_j}^2) \quad (3)$$

where R=$R_u \cup R_v$; $\overline{x_{uj}}$, $\overline{x_{vj}}$, $\overline{x_j}$ are mean values for the $j_{th}$ attribute in $R_u$, $R_w$, and R, respectively.

The memory complexity of the algorithm as presented above is $O(n^2)$ since it involves a contiguity matrix. However, since the contiguity matrix is sparse (due to the fact that an object only has a small number of spatial neighbors), the memory complexity can be easily improved to O(nd) if only pairs of spatial neighbors are kept in memory.

The above described contiguity-constrained clustering process generates two regions by minimizing the increase of SSD at each merge. To further enhance the two-region partition, a fine-tuning greedy optimization procedure is described to modify the boundaries between the two regions by moving data points from one region to the other while maintaining the contiguity of each region. This fine tuning procedure is independent of the clustering procedure. In other words, it can improve the quality of a given two-region partition, regardless of what method has been used to construct the two regions.

Suppose the above clustering step divides the data into regions A and B (each of which is spatially contiguous). The fine-tuning algorithm described herein will find the best data point or group of data points (among all the data points in A and B) that, when moved to the other region, decreases the overall SSD measure by the greatest amount. If no object can be moved to decrease the overall measure, the one that causes the least increase in SSD will be moved. While moving an object from one region to the other, the spatial contiguity of both regions must be enforced. In other words, moving an object from a region should not break the contiguity of that region.

Above moves are made repeatedly but each location can only be moved once. When all of the possible locations have been moved, the entire sequence of moves will be analyzed and the sub-sequence (i.e., the first m moves) that gives the maximum decrease in SSD will be accepted (i.e., a new partition is generated by accepting this sub-sequence of moves). Then, utilizing this new partition as the starting point, the above procedure is repeated again until there is no further improvement in SSD.

Algorithm 2: Greedy Optimization (Fine-Tuning):
Inputs: {$R_a$, $R_b$}: two regions by the contiguity-constrained clustering method
(1) Set Candidates=Ø, Moves=Ø, R1=Ra, R2=Rb
(2) Find out which objects can move between $R_1$ and $R_2$, add them to Candidates (see Section III. C for details on identifying candidates)
(3) From all candidates, find the best object obj that, if moved, decreases SSD the most (or increases SSD the least if no one can decrease)
(4) Modifying R1 and R2 by moving obj to the other region, add obj to Moves, and mark obj as "moved" (it won't be candidate again in step 2) (5) Repeat steps (2)-(4) until no candidate (6) Analyze Moves (see FIG. 1) and find the best sequence of moves that improves (decreases) SSD the most
(7) If step (6) does not find any sequence that can improve SSD, stop the fine-tuning procedure
(8) If step (6) find an improvement, modify Ra and Rb by making the best sequence of moves; remove all "moved" marks (so that those previously moved objects can move again in the next round)
(9) Repeat steps (1)-(8).

FIG. 1 shows an illustrative example of the fine-tuning procedure. Assume steps (1)-(8) are a round of fine-tuning. For round 1, FIG. 1 shows the sequence of best moves and the SSD value after each move. After analyzing the sequence, the first 4 moves are accepted since they together achieve the lowest SSD value (2600). Then round 2 starts with this new partition (after moving the four objects) and again find a sequence of moves, which consists of the first three moves (achieving an SSD value of 2450) (note: the first three objects in round 2 are not the same as the first 3 in round 1). Round 3 gives no further improvement and the fine-tuning procedure stops.

Figure 3:
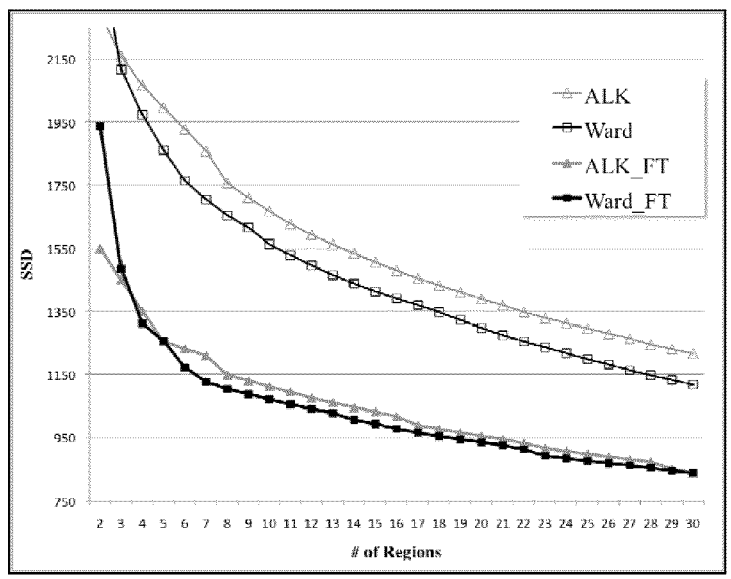
FIG. 3 illustrates a comparison of the contiguity constrained Average-Linkage clustering (ALK), Improved Ward clustering of the present disclosure (Ward), ALK with fine tuning (ALK_FT), and Ward with fine tuning (Ward_FT) and the evaluation data.
Figure 3:
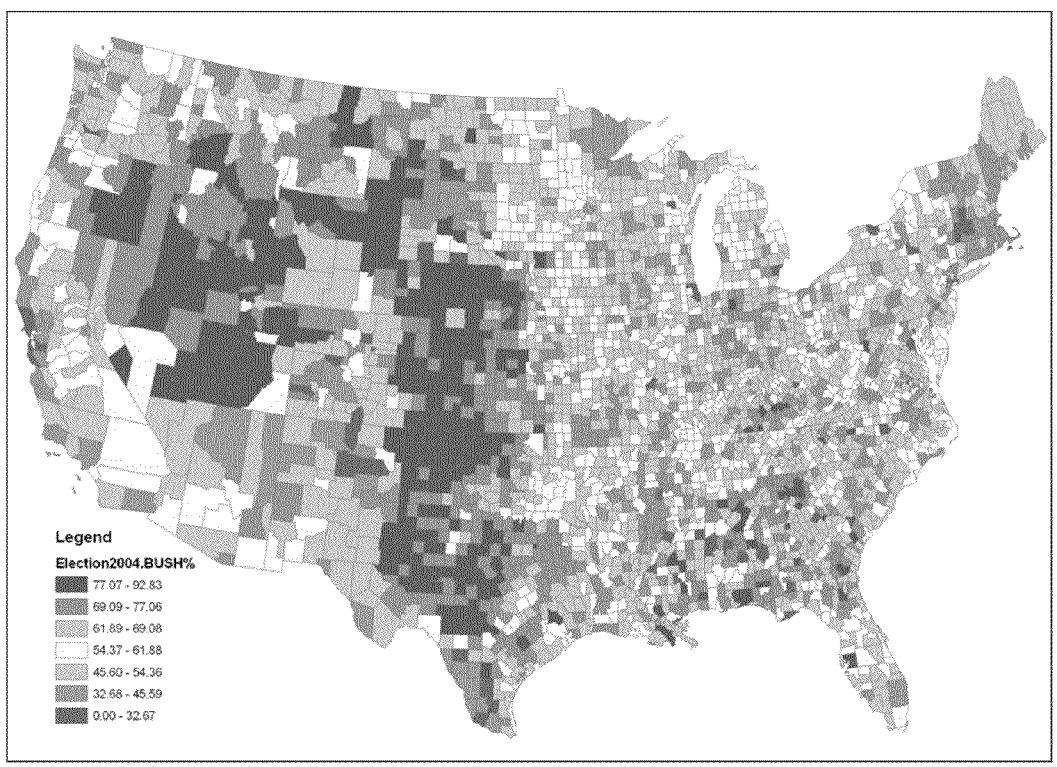
Figure 4:
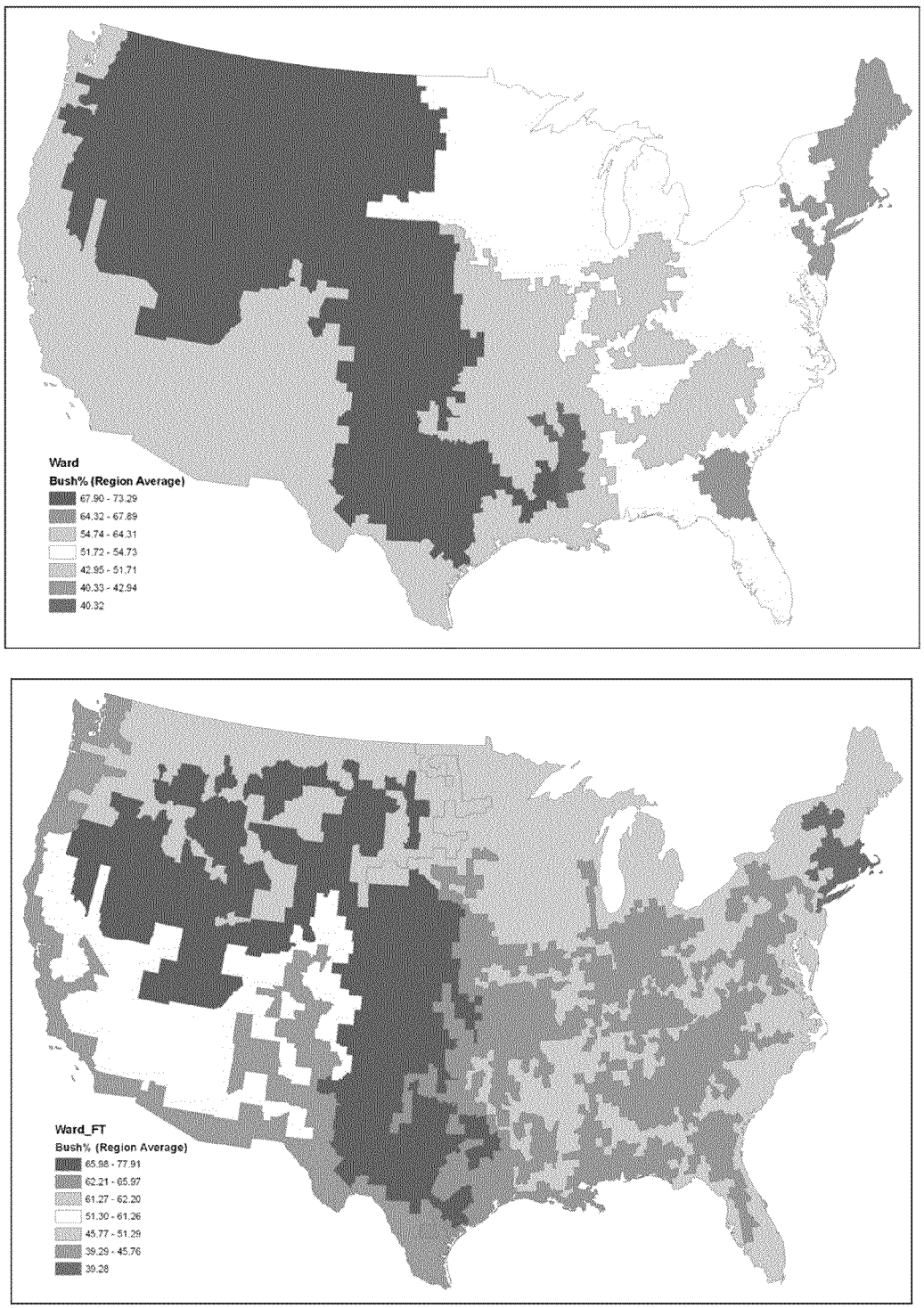
FIG. 4 illustrates seven regions derived with Ward and seven regions derived with Ward_FT.

It should be noted that the fine-tuning procedure allows objects to move even if they cause temporary increase in SSD, as long as subsequent moves can make up the loss and eventually achieve a better SSD. As such, the fine-tuning procedure has a chance to escape local optima and reach (or get close to) the global optima. FIGS. 3 and 4 shows the results of the described clustering method alone and the clustering coupled with the fine-tuning procedure. It is evident that the fine-tuning procedure can significantly improve the regionalization quality (in terms of minimizing the total SSD).

The complexity of the fine-tuning procedure is $O(n^2rd)$, where r is the number of rounds that the fine tuning procedure takes to converge and d is the number of variables. Based on the experiments described herein, r is very small, typically ranging between 2 and 5. As seen in the conceptual outline of Algorithm 2, two steps are potentially time consuming: step (2) to find candidates to move and step (3) to find the SSD difference that each candidate move may cause. For each round, step (2) is repeated about n times and step (3) is repeated $n^2$ times. As further described herein, however, step (2) can be done with $O(n)$ time. Equation 3 shows that step (3) only takes $O(d)$ time. Thus, the overall complexity of the fine-tuning procedure is $O(n^2rd)$.

The method described herein is efficient enough to process most socio-economic data sets that commonly have hundreds or thousands of spatial objects. Importantly, the present disclosure can deliver the high quality result that those applications demand. For much larger datasets, it can be extended using a multi-level strategy, which first groups group objects into small areas, and then group these small areas into larger regions using the method described herein.

The fine-tuning procedure described herein ensures spatial contiguity during the entire process. The contiguity between two spatial objects may be defined in different ways. First, it depends on the type of spatial objects (e.g., areas, lines, or points). Second, for area data (e.g., states or counties), the contiguity between two objects may be defined as (1) touching each other (even by a single point) or (2) sharing a boundary of certain length. Which definition to use is up to the user or application and is independent from the regionalization method, which only needs a contiguity matrix. In the present disclosure, the focus is on area data and two areas are contiguous if they share at least a line segment (not just a point) on the boundary.

Figure 2:
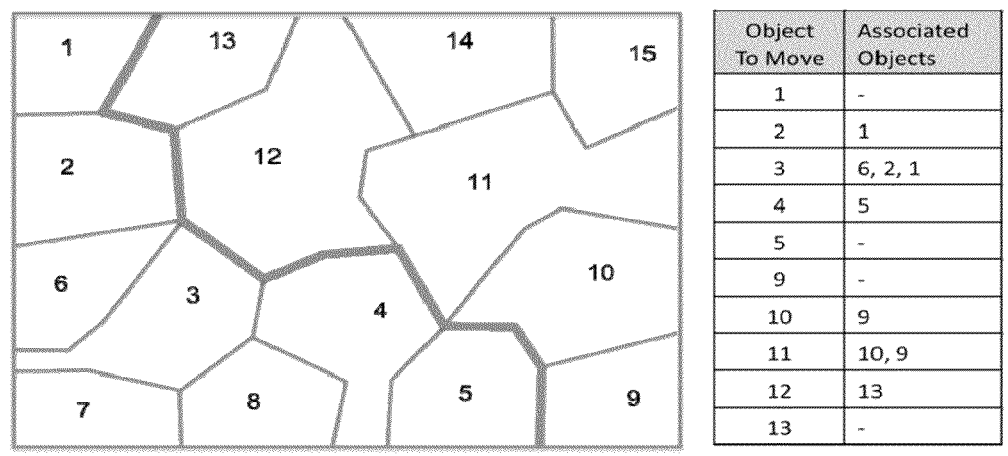
FIG. 2 illustrates a graph-based representation of spatia contiguity and candidate moves for the given two regions with the method described herein.

FIG. 2 shows illustrative example data, which has 15 data objects (areas). Two objects are spatial neighbors if they share a segment of boundary. Assume the clustering method divides the data into two regions, each being contiguous, i.e., one can start from any point in the region and walk to any other point in the region without crossing the region boundary. Then the fine-tuning procedure will attempt to modify the boundary between the two regions by moving objects from one to the other. During this process, the contiguity of each region must be maintained, which raises two issues.

First, given a partition, not all objects can move. Objects can only be moved when they are on the boundary between the two regions. Second, some objects on the boundary, when moved, can break the contiguity of the origin region (which it belongs to before the move). From a graph-based perspective, such an object is an articulation point in the graph. For example, in FIG. 2, if object 3 is moved from the left region to the right region, the former will be broken into two components {1, 2, 6} and {4, 5, 7, 8}. There are two options for this situation: do not allow object 3 to move; or move object 3 and its "associated component" together. Traditional methods use the first option. In certain embodiments of the present disclosure, the latter option is used because it provides more opportunity for improvement. Object 3 is referred to as the "primary object".

FIG. 2 (right) shows the candidate list for the partition shown in FIG. 2 (left). This list is updated in step (2) in the fine-tuning algorithm. An object is included in the list if it has not been moved before in the current round and it is on the boundary between the two regions. Each move may involve more than one object as explained above. However, after each move, only the primary object is marked as "moved" so that the objects in the associated component can still be candidates for the next move.

Updating the candidate list (see step 2 in Algorithm 2) can be time consuming, since for each candidate it needs to traverse all objects in the region to see if it is an articulation point (i.e., its move will break contiguity). A linear complexity algorithm based on dept-first search is described in Gabow, H. N. (2000), Path-based depth-first search for strong and biconnected components, Information Processing Letters, 74, 107-114, incorporated by reference herein, to detect articulation points in a graph. The algorithm is extended to find all articulation points and their associated components by traversing the neighborhood graph (see FIG. 2) only once, i.e., it takes $O(n)$ time. This procedure is repeated n time for each round in the fine-tuning procedure (see Algorithm 2).

The present disclosure presents a new regionalization method that is based on contiguity constrained clustering and greedy optimization. The evaluation results show that the new method outperforms existing methods by a large margin. Moreover, the fine-tuning optimization procedure can be combined with existing regionalization methods to significantly improve their performance.

For instance, by using WARD as the base clustering method, the proposed approach is flexible to integrate with different objective functions for different applications. With minor modification, it can also process non-metric data such as graph partitioning, under contiguity constraint. Other non-spatial constraint may also be incorporated such as the minimum size of each region or region shape requirements.

The overall complexity of the approach is $O(n^2rd)$ for computation time and $O(nd)$ for memory use. It is efficient to process 10,000 or more objects. However, a more efficient and approximate version can be developed in accordance with the present disclosure for processing very large data sets, such as high-resolution images.

The present disclosure can be better understood with reference to the following examples.

EXAMPLES

The methods of the present disclosure describe a contiguity constrained clustering method. The methods also describe a fine-tuning greedy optimization method that can significantly improve the region quality. To evaluate the performance of both contributions, two comparisons are included:

Comparing one of the best existing regionalization methods in the REDCAP family, the contiguity constrained average-linkage method (ALK), with the newly developed contiguity-constrained clustering method; and Comparing the regionalization without the fine-tuning optimization and the regionalization with the fine-tuning optimization.

Since the fine-tuning procedure is independent of the clustering method, it is combined with both the ALK and the improved contiguity-constrained clustering Ward method. Therefore, four methods are compared, i.e., ALK, Ward, ALK with fine-tuning (ALK_FT), and Ward with fine-tuning (Ward_FT).

The evaluation data being used is the 2004 election data. Although the proposed method can process any number of variables, for the ease of visual inspection, only one variable is used, i.e., the percentage of votes for Bush (FIG. 3). Note that this experiment is only for the evaluation of the regionalization methods rather than a serious analysis of elections. For the latter purpose, a political scientist may want to include more variables in the process to better define political regions. The overall complexity of the approach is linear to the number of variables and therefore it can easily handle more variables if needed.

FIG. 3 presents the regionalization quality comparison of the four methods, with the SSD values for each hierarchical level (i.e., for different number of regions). Without the fine-tuning optimization, Ward is better than ALK except for 2 regions (the first partition). The result indicates that the fine-tuning procedure can significantly improve the regionalization results of both ALK and Ward, by a large margin.

FIG. 4 shows the seven regions derived with the Ward method alone and the seven regions by the Ward method combined with the fine-tuning procedure. Comparing both with the original data in FIG. 3, it is obvious that the regions generated by the fine-tuning procedure are much better than those without the fine-tuning in terms of internal homogeneity (i.e., a smaller SSD value).

In FIG. 4, the two large regions in the Eastern part interlocks with each other but each of them still maintains spatial contiguity. If for some applications such region shapes are not desirable, one can modify the objective function or add constraints to consider shapes.

The evaluation result is demonstrated with the above one dataset, but similar performance results have also been achieved with other data sets.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

What is claimed is:

1. A regionalization method comprising:
   inputting a data set into a computer;
   utilizing the computer to perform contiguity-constrained hierarchical clustering on the data set to generate two regions while minimizing information loss associated with the regions, the information loss being defined in terms of the sum of squared distances; and
   performing a fine-tuning optimization procedure on the two regions with the computer to iteratively modify the boundaries between the two regions while minimizing information loss by moving at least one data point from one region to the other while maintaining the contiguity of each region to enhance partition quality.

2. The method of claim 1, further comprising:
   performing the method iteratively to generate a hierarchy of regions.

3. The method of claim 1, wherein the computer is configured to maintain spatial contiguity between regions.

4. The method of claim 1, wherein the method is utilized for climate zoning, public health mapping, political redistricting, or combinations thereof.

5. The method of claim 1, further comprising meeting multiple constraints during the fine-tuning procedure, the constraints comprising minimum region size, geographic contiguity, region shape, or combinations thereof.

6. The method of claim 1, wherein the contiguity-constrained hierarchical clustering on the data set minimizes the information loss associated with each region.

7. The method of claim 1, further comprising maintaining geographic contiguity by locating articulation points and allowing multiple-object moves.

8. The method of claim 1, wherein the fine-tuning procedure modifies the boundaries between the two regions by moving multiple data points from one region to the other while maintaining the contiguity of each region.

9. A system for regionalization comprising:
   a computer configured to receive a data set, the computer further configured to
   a) perform contiguity-constrained hierarchical clustering on the data set to generate two regions while minimizing information loss associated with the regions, the information loss being defined in terms of the sum of squared distances,
   b) perform a fine-tuning procedure on the two regions to iteratively modify the boundaries between the two regions while minimizing information loss by moving at least one data point from one region to the other while maintaining the contiguity of each region, and
   c) iteratively perform the preceding two steps to generate a hierarchy of regions to optimize the objective function under constraints.

10. The system of claim 9, wherein the computer is configured to perform contiguity constrained hierarchical clustering on the two regions to generate new regions and perform a fine-tuning procedure on the new regions to iteratively modify the boundaries between the new regions.

11. The system of claim 9, wherein the computer is configured to maintain spatial contiguity between regions.

12. The system of claim 9, wherein the computer is utilized for climate zoning, public health mapping, political redistricting or combinations thereof.

13. The system of claim 9, further comprising an optimization procedure to find a sequence of moves to maximize the objective function and maintain contiguity and constraints.

14. The system of claim 9, further comprising a visual interface to configure the parameters and examine the resulted regions.

15. The system of claim 9, wherein the contiguity-constrained hierarchical Clustering on the data set minimizes the information loss associated with each region.

16. The system of claim 9, wherein the fine-tuning procedure modifies the boundaries between the two regions by moving data points from one region to the other while maintaining the contiguity of each region.

17. The system of claim 9, further comprising considering different Objective functions of a user's choice.

* * * * *